United States Patent
Dorr et al.

[11] 3,988,428
[45] Oct. 26, 1976

[54] SULFUR-PRODUCING PROCESS AND SYSTEM FOR PRODUCING SULFUR DIOXIDE

[75] Inventors: Karl-Heinz Dorr, Mainz; Siegfried Bielz, Frankfurt am Main; Dan Constantinescu, Frankfurt am Main; Hubert Vollmer, Frankfurt am Main; Rudolf Beuchelt, Cologne; Hans Guth, Bergisch Neukirchen; Peter Reher, Schildgen-Nittum; Herman Wieschen, Cologne, all of Germany

[73] Assignee: Metallgesellschaft Aktiengesellschaft, Frankfurt am Main, Germany

[22] Filed: Apr. 12, 1974

[21] Appl. No.: 460,614

Related U.S. Application Data

[63] Continuation-in-part of Ser. No. 74,629, Sept. 23, 1970, abandoned.

[30] Foreign Application Priority Data

Sept. 26, 1969 Germany.......................... 1948754

[52] U.S. Cl. .................................. 423/543; 23/278
[51] Int. Cl.² ........................................ C01B 17/54
[58] Field of Search.................... 423/539, 543, 531; 23/278

[56] References Cited
UNITED STATES PATENTS

| | | | |
|---|---|---|---|
| 1,289,783 | 12/1918 | Hurt.................................. | 423/543 |
| 1,405,669 | 2/1922 | Chase et al. ......................... | 423/531 |
| 1,629,352 | 5/1927 | Merrian ............................... | 23/278 |
| 1,720,742 | 7/1929 | Mullen................................ | 423/543 |
| 1,863,705 | 6/1932 | Weinberg............................. | 423/543 |
| 1,954,879 | 4/1934 | Leuerett .............................. | 423/543 |
| 2,622,007 | 12/1952 | Allen, Jr. ............................. | 423/543 |

FOREIGN PATENTS OR APPLICATIONS 1,178,407  7/1968  Germany ........................... 423/543

Primary Examiner—Herbert T. Carter
Assistant Examiner—Gary P. Straub
Attorney, Agent, or Firm—Karl F. Ross; Herbert Dubno

[57] ABSTRACT

Sulfur dioxide is formed by the combustion of elemental sulfur in two distinct stages wherein oxygen-containing gas in a quantity which is initially less than that stoichiometrically required for total combustion of the sulfur to sulfur dioxide and the sulfur-dioxide gases and residual elemental sulfur are thereupon passed through a heat exchanger and subjected to an afterburning with additional quantities of oxygen-containing gas. 70% to 95% of the total oxygen required for combustion of sulfur is supplied in the initial or combustion stage and the remainder (i.e. 30 to 5%) is supplied in the afterburning stage.

1 Claim, 1 Drawing Figure

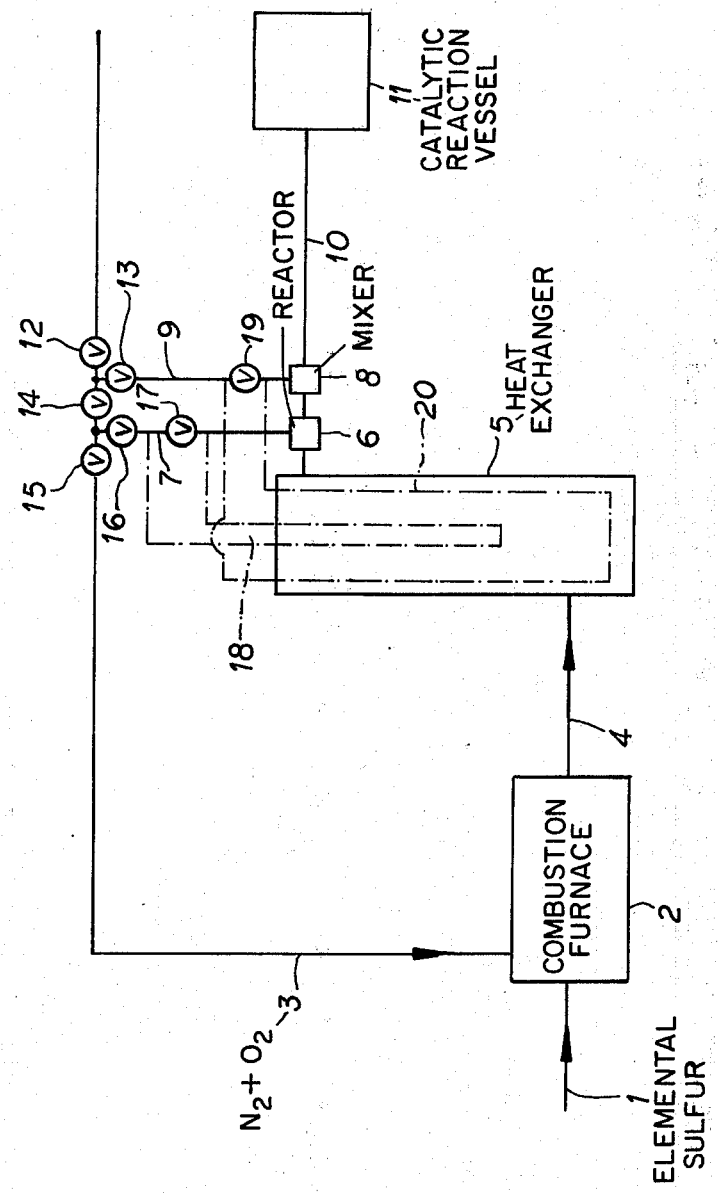

SULFUR-PRODUCING PROCESS AND SYSTEM FOR PRODUCING SULFUR DIOXIDE

CROSS-REFERENCE TO RELATED APPLICATION

This application is a continuation in part of application Ser. No. 74,629 filed 23 Sept. 1970, now abandoned.

FIELD OF THE INVENTION

Our present invention relates to a process for producing sulfur dioxide or to a process for burning sulfur and, more particularly, to a system or process for the formation of sulfur dioxide by the combustion of elemental sulfur with oxygen-containing gases, e.g. air, oxygen-enriched gas, or oxygen.

BACKGROUND OF THE INVENTION

Numerous processes for producing sulfur dioxide have been proposed heretofore, these processes involved a roasting of sulfur-containing ores, particularly pyrites, or combustion of elemental sulfur. The processes may be described by the formulae:

In the stoichiometry of this process, one mole of oxygen reacts with one mole of sulfur to yield one mole of sulfur dioxide. The ore-roasting furnaces which have been used heretofore are multiple-hearth furnaces, fluidized-bed furnaces and rotary kilns. The systems for burning elemental sulfur are generally fluidized-bed furnaces and especially atomizing burners of verious types.

For the most part, roasting and combustion are controlled so that the sulfur is roasted or burned as completely as possible to form gases which, to the greatest possible extent, are constituted by sulfur dioxide. In order to achieve this object, it is known to provide a sulfur-burning furnace with compressed air via a horizontal heating plate which forces the gas to flow along a predetermined path and prevents an escape of sulfur dust or fumes. It is also conventional to introduce sulfur power into a stream of air or oxygen in such manner that the sulfur is ignited at the moment it meets the stream of air or oxygen and is burned immediately.

In substantially all prior-art processes, an important problem is the formation of sulfur trioxide under the stringent conditions at which the sulfur is burnt or reacted. It has long been sought to provide a sulfur-combustion process which produces a gas free from sulfur trioxide or at least containing substantially less sulfur trioxide than is present in the ordinary sulfur-dioxide gases. The problem has been solved heretofore by the use of the oxygen-containing gas in substantial stoichiometric deficiency. It had also been proposed that oxygen or air be passed through hot liquid sulfur or the sulfur burned in the presence of a surplus of elemental sulfur or sulfur fumes to reduce the temperature at which combustion takes place. Mention may also be made of processes which form sulfur-dioxide gases by the combustion of sulfur with the aim to convert all or part of the sulfur dioxide to sulfur trioxide for use in the production of sulfuric acid or analogous products. In such systems, the heat content of the combustion gases is in part recovered and the sulfur-dioxide gas may be catalytically reacted to form sulfur trioxide. To this end, the sulfur is burned with the aid of a partial stream of predried air, i.e. a stream containing oxygen gas in a stoichiometric deficiency below that required to react all of the sulfur. The resultant gas stream is cooled in the heat exchanger, diluted with more predried air and the entire stream supplied to a catalytic reaction plant.

In all of the earliest processes for the purposes indicated, only a small throughput was obtained. In the more recent proposals, the disadvantage of a small throughput is obviated, although the higher concentration of sulfur dioxide in the combustion gas requires that the combustion be supported by oxygen-enriched air or pure oxygen, yielding in a higher combustion temperature, and gives rise to the formation, at the elevated temperatures, of nitrous oxide by reaction of the major components ($N_2$ and $O_2$) of ambient air. The nitrous oxide may result in a contamination of the end product, whether this consists of liquid sulfur dioxide or sulfuric acid, and also can lead to difficulties with respect to corrosion. It is not a practical solution to remove the nitrogen oxide from the product.

OBJECTS OF THE INVENTION

It is, therefore, the principal object of the present invention to provide an improved process for producing sulfur dioxide, for liquefaction, for reaction to form sulfuric acid, or for any purpose which requires same, the process obviating the aforementioned disadvantages.

It is another object of this invention to provide an improved method of or system for converting elemental sulfur into sulfur dioxide which is efficient, readily controlled, and able to be practiced at low cost.

It is still another object of our invention to provide an improved process for recovering sulfur dioxide from elemental sulfur in a form which is uncontaminated by other gaseous constituents.

SUMMARY OF THE INVENTION

These objects and others which will become apparent hereinafter are obtained, in accordance with the present invention which is based upon our surprising discovery that a two-stage process for reacting sulfur with oxygen may be performed at temperatures well below those which give rise to the formation of nitrous oxide when the first stage is carried out with a stoichiometric deficiency (70 to 95% of requirements) of oxygen and the stoichiometric deficiency is made up in second stage of the process.

The process according to the present invention thus comprises a stagewise combustion of elemental sulfur with the aid of oxygen-containing gases i.e. gases containing free or molecular oxygen, such that the elemental sulfur is initially burned in the presence of oxygen at a concentration of the latter which is less than that stoichiometrically required for combustion of all of the sulfur to be reacted.

While it has been suggested that to use less than a stoichiometric quantity of oxygen in a combustion process might be obvious, the problem faced by us is unusual in that one normally would expect that larger quantities of oxygen, and indeed more than the stoichiometric equivalent, would be preferable if sulfur dioxide is desired.

We have found that the disadvantages of combustion with oxygen in more than a stoichiometric quantity, or even of initial reaction with a stoichiometric quantity, namely, the production of sulfur trioxide, can be avoided if the combustion is as complete as possible (as guaranteed by the atomizing burner) so as to be limited only by the oxygen quantity provided, namely, 70 to 95%.

Of greater importance is the fact that the mere limitation of the oxygen available does not guarantee that part of the sulfur will not see the combustion gas as more than the stoichiometric quantity, while another part will not meet oxygen containing gas at all when conventional combustion is employed. Localized reaction to produce sulfur trioxide would be expected even if the full stoichiometric quantity of oxygen was not supplied in the initial stage and this stage was carried out in accordance with conventional processes.

We have found, quite surprisingly, that when the combustion is limited to an oxygen supply of 70 to 95% of stoichiometric oxygen, and the reaction is carried out in an atomizing burner the sulfur trioxide does not form or, if formed, reacts immediately to eliminate sulfur trioxide and enable the subsequent reaction stage to be carried out with only the balance of oxygen to yield fully burned sulfur and to ensure that the latter is fully converted to sulfur dioxide.

As will be apparent, a mixture of sulfur and sulfur dioxide, to which is supplied a balance of oxygen, merely provides for the sulfur the full oxygen quantity necessary for the second stage reaction, without the atomizing treatment described earlier. This reaction has, as to this sulfur, defects of a first combustion stage using 100% of stoichiometric oxygen. This defect does not arise when the first stage is carried out in an atomizing burner to 70 to 95% of completion as controlled by a corresponding availability of oxygen and when the final reaction stage takes place at a temperature below 1000° C after the gas mixture is cooled in a heat exchanger apart from the two combustion stages.

An essential characteristic of the invention is that when this procedure is followed, the gases are free from nitrous oxides which derive from reaction of atmospheric nitrogen with the oxygen available in most sulfur combustion stages. Here again the temperature limit and the intermediate cooling or step precludes the formation of nitrogen oxides as would otherwise arise.

According to an essential feature of this invention, this preliminary combustion is carried out prior to a passage of the resulting gases, i.e. gases containing sulfur dioxide and residual sulfur, through a heat exchanger in which part of the heat produced by the combustion is abstracted from the gases which are thereafter burned with a subsequently fed additional supply of oxygen-containing gases corresponding to the stoichiometric difference.

In the combustion (initial) stage, therefore, the elemental sulfur is burned first in the presence of oxygen at a concentration which is less than that stoichiometrically required and the resulting gases, which contain sulfur dioxide and sulfur, are next passed through a heat exchanger and are then afterburned with the air of later-added oxygen-containing gases completing the stoichiometric requirement.

Surprisingly, it is found to be of vital importance that the initial combustion takes place with at least 70% of the oxygen stoichiometrically required for the total reaction and we have found that the entire quantity of oxygen-containing gas required for the combustion of sulfur should be divided in such manner that 70 to 95% by volume is used in the combustion stage and 30 to 5% by volume (balance) is used in the afterburning stage. Another parameter which has been found to be important is the temperature at which the afterburning is carried out and we have observed that, where the production of nitrous oxide is undesirable and a danger, this temperature should be below 1000° C. In fact, the gases which emerge from the process in the present invention are found to be substantially completely free from any nitrous oxide.

It will be appreciated that the amounts of sulfur which are reacted during the afterburning stage are relatively small by comparison with the quantity of sulfur which is reacted in the entire process and that the heat of reaction produced by afterburning is relatively small. The area required for heat exchange with the gases is less and control of the temperature is a simpler problem.

Depending on the concentration of sulfur dioxide desired, e.g. in the catalytic reaction plant, the temperature of the gas which leaves the heat exchanger may be adjusted so that the admixture of oxygen-containing gases for the afterburning results in a gas mixture at a temperature which is optimum for the catalytic reaction plant. In other words, an important feature of this invention resides in the control of the temperature of the sulfur-dioxide gases by regulating the quantity of oxygen-containing gas which is admixed with the gases emerging from the earlier combustion stage.

The rate at which the sulfur-dioxide gases are required (in the catalytic reaction plant) may be subject to fluctuation, which in known processes must be compensated for by changes in the heat-exchange surface area of heat exchangers abstracting heat from the sulfur dioxide stream. In the process according to the invention, however, the sub-division of the oxygen-containing gases (between the initial or combustion stage and the final or reaction stage) can be changed in a simple manner to follow such fluctuations. The heat-exchange surface area may remain constant since the quantity of gas passing through the heat exchanger and the temperature of the gas be controlled by selection of the proper quantity of the combustion-sustaining gas in the initial stage. Where gases are desired which have a sulfur dioxide concentration well below the concentration which can be obtained by the process according to the invention, e.g. gases having a sulfur dioxide concentration in the range of 8 to 12% as commonly used in plants for the catalytic production of sulfur trioxide with sulfuric acid, we have found it advantageous to add further oxygen-containing gases in a gas mixer downstream of the afterburning stage.

According to a further feature of the invention, the temperature of the gas delivered to the catalytic reaction plant is adjusted by preheating adjustably either the oxygen-containing gases introduced at the afterburning stage or the oxygen-containing gases mixed with the gases leaving this latter stage in the diluting step mentioned above.

It will generally be desirable to carry out the process of the present invention in such manner that the combustion gases leaving the heat exchanger have a certain concentration of elemental sulfur. This sulfur content can be adjusted, maintained or regulated by modifying the sulfur input to the main combustion step and/or by providing a secondary adjusting stage (for fine adjustment) at which sulfur is added to the stream. The sulfur content in the combustion gas leaving the combustion stage will depend upon the temperature of the heat exchange surfaces and vice versa because the temperature of the heat exchange surfaces should not be less than the dewpoint of the sulfur and the combustion gas. If the temperature is lower, however, sulfur precipitates onto these surfaces and is not available in the gases emerging from the heat exchanger.

In the main combustion stage, the sulfur according to the present invention is burned in conventional furnaces, preferably using atomizing burners as is described in German patent 1,178,407. The gases leaving the sulfur-burning furnace should have temperatures of 1300° to 1600° C and contain 10 to 200 grams of sulfur per cubic meter (standard temperature and pressure, STP). The oxygen content of the combustion gases is virtually at zero, i.e. substantially all of the oxygen of the input gases is converted to sulfur dioxide. The heat exchangers are of conventional configuration and may have the shape and construction of waste-heat boilers such as have been used heretofore for the generation of steam. The afterburner may be a chamber which is lined with refractory material or is provided with tubes and which is either a separate unit downstream of the heat exchanger or is provided in the gas outlet of the heat exchanger and is structurally combined with the latter.

DESCRIPTION OF THE DRAWING

The invention is described in greater detail below with reference to the accompanying drawing and specific Examples. The sole FIGURE of the drawing is a diagram illustrating the process.

SPECIFIC DESCRIPTION

In the drawing, we have shown a system for the production of sulfur dioxide as a preliminary stage in the production of surlfuric acid, i.e. as an input stage to a catalytic system for converting sulfur dioxide to sulfur trioxide, the latter being dissolved in water to form sulfuric acid. Elemental sulfur is supplied in liquid form through the conduit 1 to the combustion furnace 2. The oxygen-containing gas, e.g. air, oxygen-enriched air or oxygen, is supplied via conduit 3.

The combustion gases, which contain hot elemental sulfur and sulfur dioxide, together with nitrogen when air is used as the oxygen carrier, emerge via conduit 4 into the heat exchanger 5 in which the gases are cooled. Water or other coolant may be circulated through the heat exchanger to abstract the heat. At the outlet of the heat exchanger 5, there is provided a reactor 6 in which gases which still contain elemental sulfur are afterburned with the aid of oxygen-containing gases supplied via conduit 7. Additional oxygen-containing gas, e.g. air as noted earlier, is supplied via conduit 9 and admixed with the sulfur dioxide stream emerging from the unit 6 in a mixer 8 to provide the desired concentration of sulfur dioxide and the desired reaction temperature. The sulfur-dioxide gas finally flows through conduit 10 to the catalytic reaction vessel 11 in which it is reacted with oxygen to form sulfur trioxide, the latter being dissolved in water to produce sulfuric acid.

Valves 12, 13 and 14 in lines 3 and 9 determine the proportion of oxygen-containing gas diverted to the mixer 8, while valves 14, 15 and 16 subdivide the remaining quantity of oxygen-containing gas to the reactor or afterburner 6 and the main combustion chamber 2. Line 7 may be provided with a valve 17 controlling the flow of oxygen-containing gas to a loop 18 passing through the heat exchanger 5 and heated thereby to control the temperature of the oxygen-containing gas admixed with the sulfur dioxide stream in reaction chamber 6. Similarly, a valve 19 is provided in line 9 to bridge a selected quantity of the bases to dilution chamber 8 through a branch 20 in which such gases are heated to control the temperature of the gases delivered to the catalytic reactor 11.

SPECIFIC EXAMPLES

EXAMPLE I

Using the system illustrated in the drawing with the production of sulfur dioxide gas containing 10% by volume sulfur dioxide and adapted to be processed to produce sulfuric acid, elemental sulfur in liquid form and air are supplied through conduit 1 and conduit 3, respectively, to an atomizing burner or main combustion reactor at rates of 8400 kg/hour and 27,500 standard m³/hour, respectively. Combustion yield gas at a temperature 1600°C and containing 20.6% sulfur dioxide by volume and about 20 grams of unreacted sulfur vapor per standard m³. The oxygen-free gas was supplied through conduit 4 to the heat exchanger 5 which had the configuration of a waste-heat boiler. In the heat exchanger, the gases were cooled at a temperature of about 750°C. Air was supplied at a rate of 4400 m³/hour (STP) to the reactor 6 via conduit 7 for reaction with the sulfur-containing gas. The mixer 8 was supplied via conduit 9 with air at a rate of 25,600 m³/hour (STP). The gas delivered at 10 to the catalytic reaction vessel had a temperature of about 450° C and a sulfur dioxide concentration of about 10% by volume. The output gas was discharged at a rate of 57,500 m³/hour (STP) and contained 16.8 metric tons of sulfur dioxide per hour.

EXAMPLE II

A gas containing 18% by volume sulfur dioxide and intended for sulfurization reactions in organic chemistry, is produced using the basic system illustrated in the drawing. The atomizing burner 2 is supplied to conduit 1 with elemental sulfur in liquid form at a rate of 8350 kg/hour. Air via conduit 3 is supplied to the reactor at a rate of 25,700 m³/hour (STP). The initial combustion stage resulted in the gas at a temperature of about 1600° C and containing 20.6% by volume sulfur dioxide and 20 grams of sulfur (vapor) per m³ (STP). The oxygen-free gas was supplied to a conduit 4 to a waste-heat boiler 5 in which the gas was cooled to a temperature of about 440°C. Thereafter, the gas flow to the afterburners 6 for reaction with 2150 m³/hour (STP) of air. 4150 standard m³ of air was delivered to the mixer 8. The gas was discharged through conduit 10 for consumption at a temperature of 450° C and a sulfur dioxide concentration of about 18% by volume. The output per hour amounted to 32000 m³ (STP) of gas which contains 16.7 metric tons of sulfur dioxide.

We claim:

1. In the process for the production of sulfur dioxide in which sulfur is burnt with a stoichiometric deficiency of oxygen with a gas containing nitrogen and oxygen and the resulting gas mixture is thereafter burnt with additional gas containing nitrogen and oxygen to transform substantially all of the sulfur to sulfur dioxide, the improvement for controlling the temperature of the sulfur dioxide-containing product gas and ensuring the absence of nitrous oxide therein which comprises:

a. initially producing an oxygen-free gas containing sulfur dioxide and residual sulfur by burning a quantity of elemental sulfur with a gas containing nitrogen and oxygen at a temperature of 1300° C to 1600° C, the latter gas being present in an amount sufficient to provide 70 to 95% of the stoichiometric quantity of oxygen necessary to react with said quantity of elemental sulfur to completely convert it to sulfur dioxide;

b. thereafter passing the oxygen-free gas formed in step (a) through a circulated-coolant heat exchanger to abstract heat therefrom and reduce the temperature of the latter gas to a temperature above its dewpoint;

c. afterburning the gas cooled in step (b) at a temperature below 1000°C with a further supply of said gas containing nitrogen and oxygen to complete the stoichiometric quantity of oxygen required to convert said quantity of elemental sulfur to sulfur dioxide and corresponding to 30% to 5% of said stoichiometric quantity of oxygen; and d. controlling the temperature of the gases emerging from step (c) by regulating the distribution of the nitrogen and oxygen containing gas between steps (a) and (c).

* * * * *